(12) United States Patent
Nakayama (10) Patent No.: US 9,066,011 B2
(45) Date of Patent: Jun. 23, 2015

(54) IMAGE SYNTHESIZING APPARATUS THAT SYNTHESIZES MULTIPLE IMAGES TO OBTAIN MOVING IMAGE, CONTROL METHOD THEREFOR, AND STORAGE MEDIUM

(75) Inventor: Fumitaka Nakayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 13/530,923

(22) Filed: Jun. 22, 2012

(65) Prior Publication Data

US 2013/0002952 A1  Jan. 3, 2013

(30) Foreign Application Priority Data

Jun. 30, 2011  (JP) ................. 2011-145591

(51) Int. Cl.
*H04N 5/232* (2006.01)
(52) U.S. Cl.
CPC ....... *H04N 5/23232* (2013.01); *H04N 5/23277* (2013.01); *H04N 5/23267* (2013.01)
(58) Field of Classification Search
CPC ............ H04N 5/23277; H04N 5/2327; H04N 5/23264; H04N 5/23248; H04N 5/23229; H04N 5/23267
USPC ........... 348/208.99, 208.4, 208.6, 222.1, 297, 348/229.1
See application file for complete search history.

(56) References Cited

U.S. PATENT DOCUMENTS

2008/0088711 A1* 4/2008 Border et al. .............. 348/222.1
2009/0115717 A1* 5/2009 Sagawa et al. ................ 345/100
2011/0096179 A1* 4/2011 Border et al. .............. 348/208.4

FOREIGN PATENT DOCUMENTS

| JP | 05-007336 | 1/1993 |
| JP | 2006-191305 | 7/2006 |
| JP | 2006-253810 | 9/2006 |

OTHER PUBLICATIONS

The Binary Adder, Feb. 1, 2011, retrieved from archive.org on Sep. 5, 2014.*

* cited by examiner

*Primary Examiner* — Nicholas Giles
(74) *Attorney, Agent, or Firm* — Cowan, Liebowitz & Latman, P.C.

(57) ABSTRACT

An image synthesizing apparatus which is capable of, when synthesizing moving images, carrying out an image synthesizing process without bringing about increases in processing time and the amount of transfer to memory irrespective of the number of images to be synthesized. A preset number of frames are synthesized to obtain a first synthesized image. When an image of another frame is to be synthesized with the first synthesized image, an image of a predetermined frame used for the synthesis obtaining the first synthesized image is subtracted from the first synthesized image, and the image of the other frame is added to the first synthesized image to generate a synthesized image.

16 Claims, 12 Drawing Sheets

IMAGE SYNTHESIZING APPARATUS THAT SYNTHESIZES MULTIPLE IMAGES TO OBTAIN MOVING IMAGE, CONTROL METHOD THEREFOR, AND STORAGE MEDIUM

BACKGROUND OF THE INVENTION

1. Field of the Invention

The present invention relates to an image synthesizing apparatus that synthesizes a plurality of images to obtain a moving image, a control method therefor, and a computer-readable storage medium storing a control program for implementing the method.

2. Description of the Related Art

In recent years, various methods have been proposed for image stabilization in image pickup apparatuses such as digital cameras. Among them, there are methods in which shooting is performed to take a plurality of underexposed images at a shutter speed at which camera shake is not likely to occur, and after the shooting, the plurality of images are synthesized to obtain a correctly-exposed image.

For example, there is a method in which when images are to be synthesized, images are subjected to temporal alignment (also called displacement correction) and then synthesized to generate one still image (see Japanese Laid-Open Patent Publication (Kokai) No. H05-7336).

Further, there is a method in which not all of images obtained as a result of shooting are synthesized, but the number of images required for synthesis is determined according to image information obtained during shooting, and the determined number of images are synthesized (see Japanese Laid-Open Patent Publication (Kokai) No. 2006-191305 or Japanese Laid-Open Patent Publication (Kokai) No. 2006-253810).

According to any of the patent literatures mentioned above, still images are synthesized, and if moving images are to be synthesized, not only processing time required for synthesis would increase but also the amount of data transferred to memory would increase.

SUMMARY OF THE INVENTION

The present invention provides an image synthesizing apparatus capable of, when synthesizing moving images, carrying out an image synthesizing process while preventing increases in processing time and the amount of data transferred to memory irrespective of the number of images to be synthesized, a control method for the apparatus, and a computer-readable storage medium storing a control program for implementing the method.

Accordingly, a first aspect of the present invention provides an image synthesizing apparatus that synthesizes a plurality of frames to obtain a synthesized image, comprising a first synthesizing unit configured to synthesize a preset number of frames to obtain a first synthesized image, and a second synthesizing unit configured to, when an image of another frame is to be synthesized with the first synthesized image, subtract an image of a predetermined frame used for the synthesis obtaining the first synthesized image from the first synthesized image, and add the image of the other frame to the first synthesized image to generate a synthesized image.

Accordingly, a second aspect of the present invention provides a control method for an image synthesizing apparatus that synthesizes a plurality of frames to obtain a synthesized image, comprising a first synthesizing step of synthesizing a preset number of frames to obtain a first synthesized image, and a second synthesizing step of, when an image of another frame is to be synthesized with the first synthesized image, subtracting an image of a predetermined frame used for the synthesis obtaining the first synthesized image from the first synthesized image, and adding the image of the other frame to the first synthesized image to generate a synthesized image.

Accordingly, a third aspect of the present invention provides a non-transitory computer-readable storage medium storing a control program for causing an image synthesizing apparatus to implement a control method used by the image synthesizing apparatus that synthesizes a plurality of frames to obtain a synthesized image, the control method comprising a first synthesizing step of synthesizing a preset number of frames to obtain a first synthesized image, and a second synthesizing step of, when an image of another frame is to be synthesized with the first synthesized image, subtracting an image of a predetermined frame used for the synthesis obtaining the first synthesized image from the first synthesized image, and adding the image of the other frame to the first synthesized image to generate a synthesized image.

According to the present invention, when moving images are to be synthesized, an image synthesizing process can be carried out without bringing about increases in processing time and the amount of data transferred to memory irrespective of the number of images to be synthesized.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Here, a description will be given of an image synthesizing process in a conventional image synthesizing apparatus.

Figure 9:
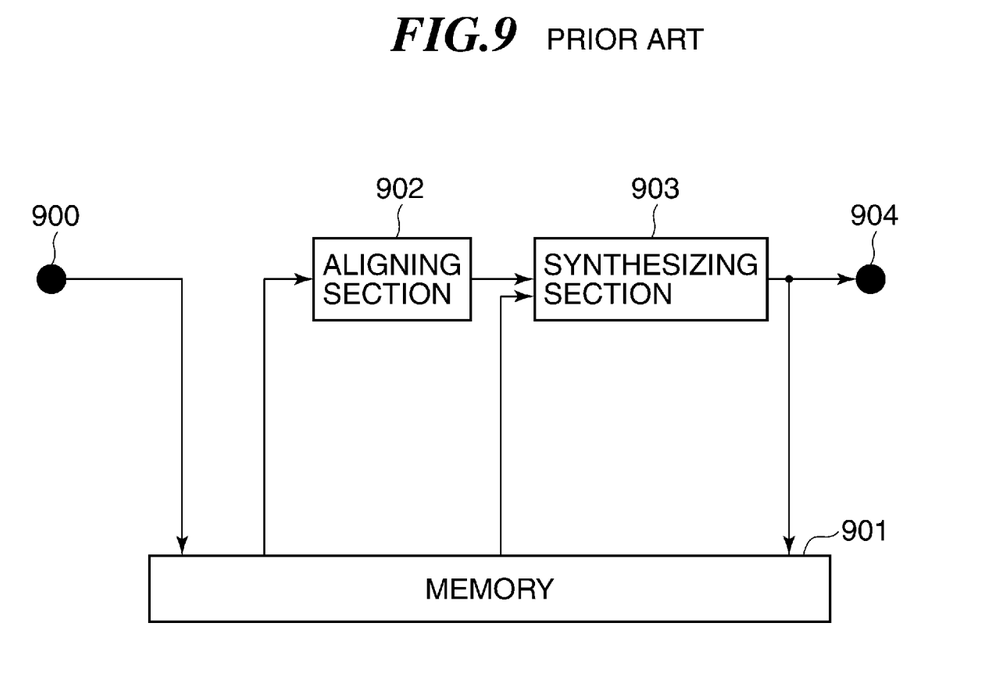
FIG. 9 is a block diagram showing an exemplary conventional image synthesizing apparatus.
Figure 10:
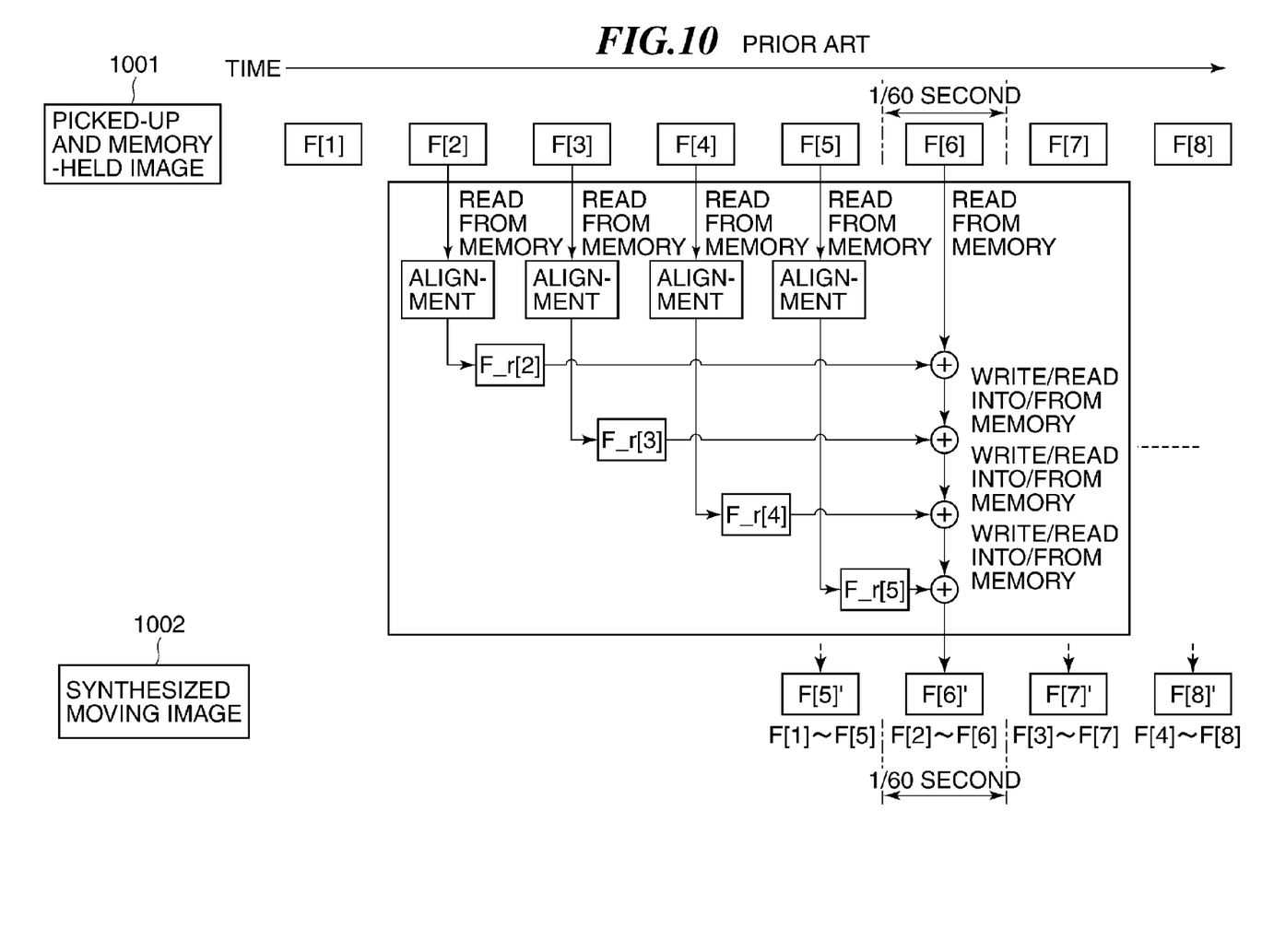
FIG. 10 is a diagram useful in explaining an image synthesizing process in the image synthesizing apparatus shown in FIG. 9.

FIG. 9 is a block diagram showing an exemplary conventional image synthesizing apparatus. FIG. 10 is a diagram useful in explaining an image synthesizing process in the image synthesizing apparatus shown in FIG. 9.

Referring to FIGS. 9 and 10, the image synthesizing apparatus shown in the figures is a so-called cyclic image synthesizing apparatus, and when there is a change in the number of images to be synthesized, changes the number of cycles so as to cope with changes in the number of images to be synthesized. Assume now that five images are synthesized from picked-up and memory-held images 1001 stored in a memory 901. When images of the first (F[1]) to fifth frames (F[5]) are input one by one from an input section 900, the images of the first (F[1]) to fifth frames (F[5]) are temporarily held in the memory 901.

Then, an aligning section 902 reads the image F[1] and aligns the same with the image F[5] to generate an image F_r[1]. With the same timing, a synthesizing section 903 reads the image F[5], synthesizes the same with the image F_r[1], and holds a resultant synthesized image in the memory 901.

The same process is repeatedly carried out for the second, third, and fourth frames, and in the end, when the images of the first to fifth frames have been completely synthesized, the synthesizing section 903 outputs a resultant synthesized image (synthesized moving image 1002) to an output section 904. On this occasion, when there is any image that is not subjected to synthesis, the synthesizing section 903 does not read this image from the memory 901.

Here, the image synthesizing apparatus shown in FIG. 9 synthesizes still images, and if moving images are to be synthesized, not only the time period required for synthesis will inevitably increase but also the amount of data transferred to memory will increase.

For example, assume that as shown in FIG. 10, moving images are taken at 60 fps which is a frame rate for ordinary moving images, and a resultant synthesized moving image is recorded and output at a frame rate of 60 fps. In this case, in order to synthesize five images, it is necessary to complete temporal alignment and image synthesis on the five images within 1/60 second.

Further, reads/writes from and into memory, which correspond in number to the number of images to be synthesized, occur within 1/60 second. For this reason, as compared to a case where still images are synthesized, the amount of data transferred to memory increases. Thus, as the number of images to be synthesized increases, the processing time and the amount of data transferred to memory increase.

Accordingly, in the present embodiment, a synthesized image can be generated by one image addition and one image subtraction, so that even when the number of images to be synthesized increases, synthesis can be performed without bringing about increases in the processing time and the amount of data transferred to memory.

Figure 1:
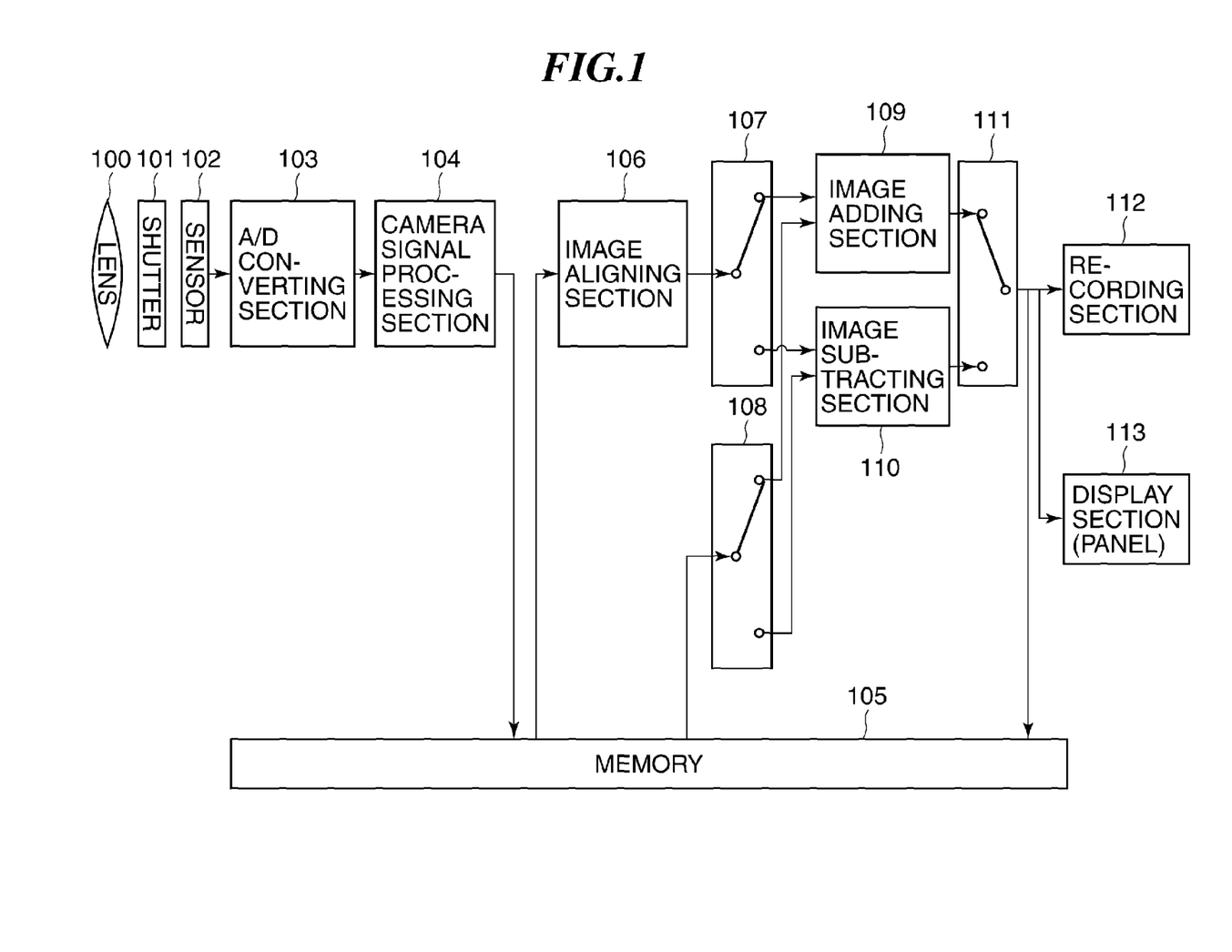
FIG. 1 is a block diagram showing an image pickup apparatus for which an exemplary image synthesizing apparatus according to a first embodiment of the present invention is used.

FIG. 1 is a block diagram showing an image pickup apparatus for which an exemplary image synthesizing apparatus according to a first embodiment of the present invention is used.

The image pickup apparatus shown in the figure is a digital video camera, and takes moving images and synthesizes them. Referring to FIG. 1, the digital video camera has a lens 100 and a shutter 101. It should be noted that the shutter 101 includes a so-called electronic shutter as well as a mechanical shutter.

An optical image is formed on an image pickup device such as a CMOS sensor 102 via the lens 100 and the shutter 101. The CMOS sensor 102 converts the optical image into an analog signal, and outputs this analog signal to an A/D conversion section 103. The A/D conversion section 103 then carries out A/D conversion on the analog signal and supplies a resultant signal as the digital signal (image signal) to a camera signal processing section 104.

The camera signal processing section 104 carries out various types of image processing such as resizing and development on the image signal to obtain image data. Then, the camera signal processing section 104 writes the image data into a memory 105. Here, the image data obtained as a result of shooting by the digital video camera is moving image data, which has a plurality of frames, and the image data is written into the memory 105 on a frame-by-frame basis. It should be noted that in the following description, it is assumed that moving image data is comprised of five frames.

The image aligning section 106 (image aligning unit) reads image data from the memory 105 and aligns reference image data with other image data as will be described later. As shown in the figure, a first switch section 107 is connected to an output of the image aligning section 106, and a second switch section 108 is connected to the memory 105. The first switch section 107 selectively supplies image data obtained as a result of alignment to one of an image adding section 109 (adding unit) and an image subtracting section 110 (subtracting unit). Likewise, the second switch section 108 selectively supplies image data read from the memory 105 to one of the image adding section 109 and the image subtracting section 110.

The image adding section 109 adds together image data obtained as a result of alignment and image data read from the memory 105. Namely, the image adding section 109 adds two images together. The image subtracting section 110 performs subtraction between image data obtained as a result of alignment and image data read from the memory 105. Namely, the image subtracting section 110 performs subtraction between two images.

An output of the image adding section 109 and an output of the image subtracting section 110 are connected to a third switch section 111. The third switch section 111 selectively outputs an output from the image adding section 109 and an output from the image subtracting section 110 as output image data. The output image data is written into the memory 105 and also supplied to a recording section 112 and a display section 113. The recording section 112 records the output image data in a recording medium such as a flash memory or an HDD. The display section 113 displays the output image data as an image.

It should be noted that although not shown in FIG. 1, the camera signal processing section 104, the image aligning section 106, the first switch section 107, the second switch section 108, the third switch section 111, the image adding section 109, the image subtracting section 110, and so on operate under the control of a CPU.

Figure 2A:
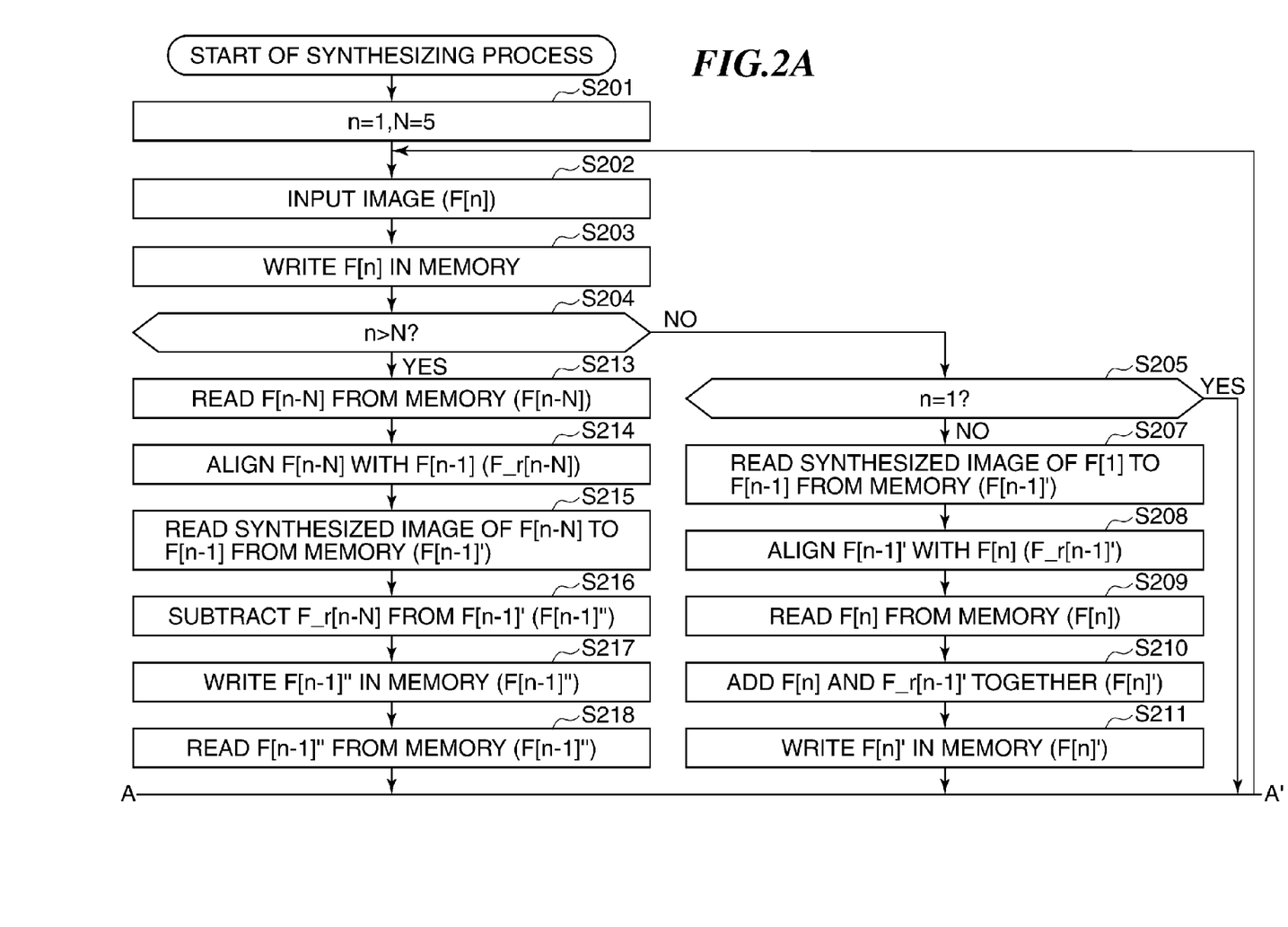
FIGS. 2A and 2B are flowcharts of an image synthesizing process in the digital video camera shown in FIG. 1.
Figure 2B:
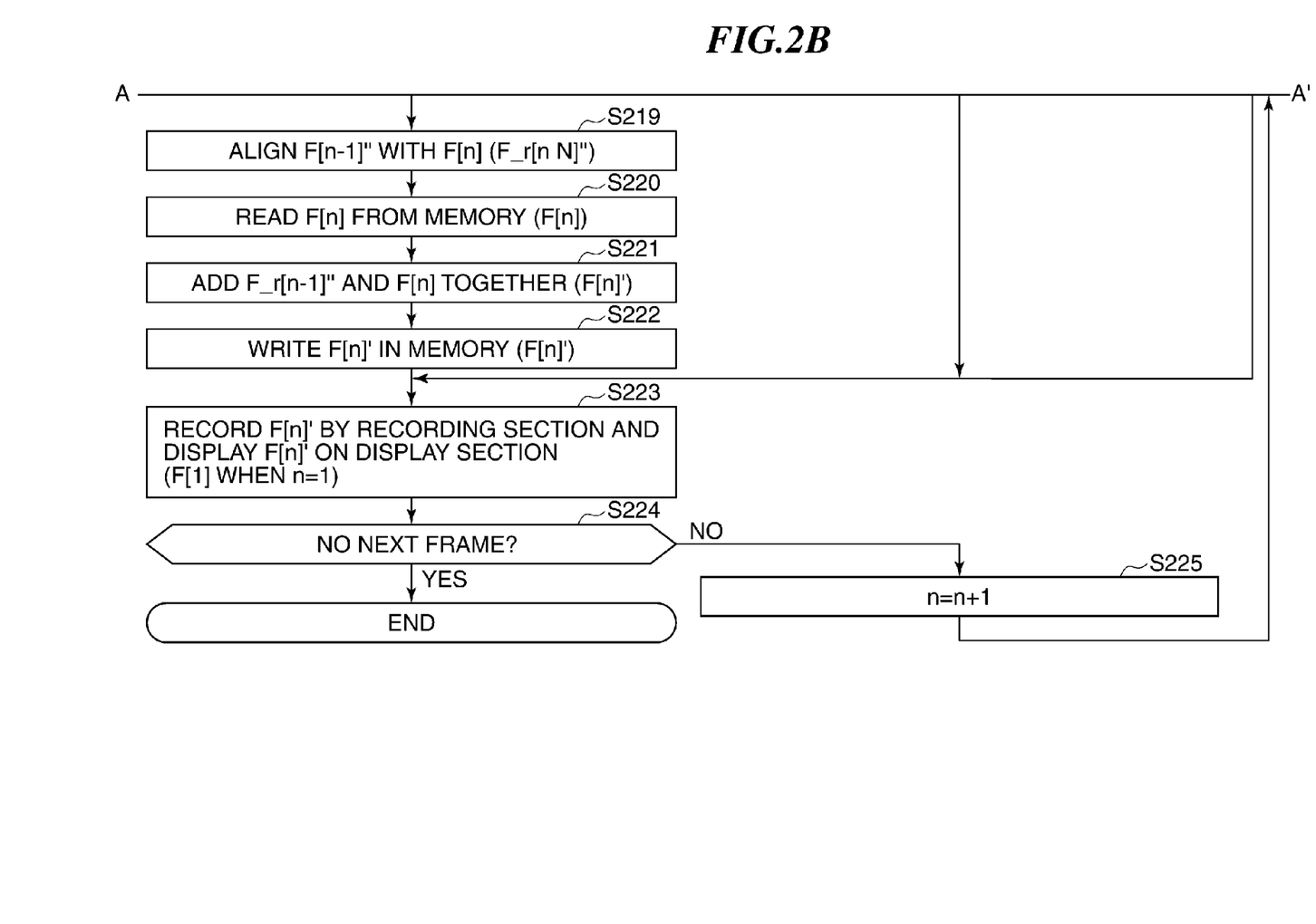
Figure 3:
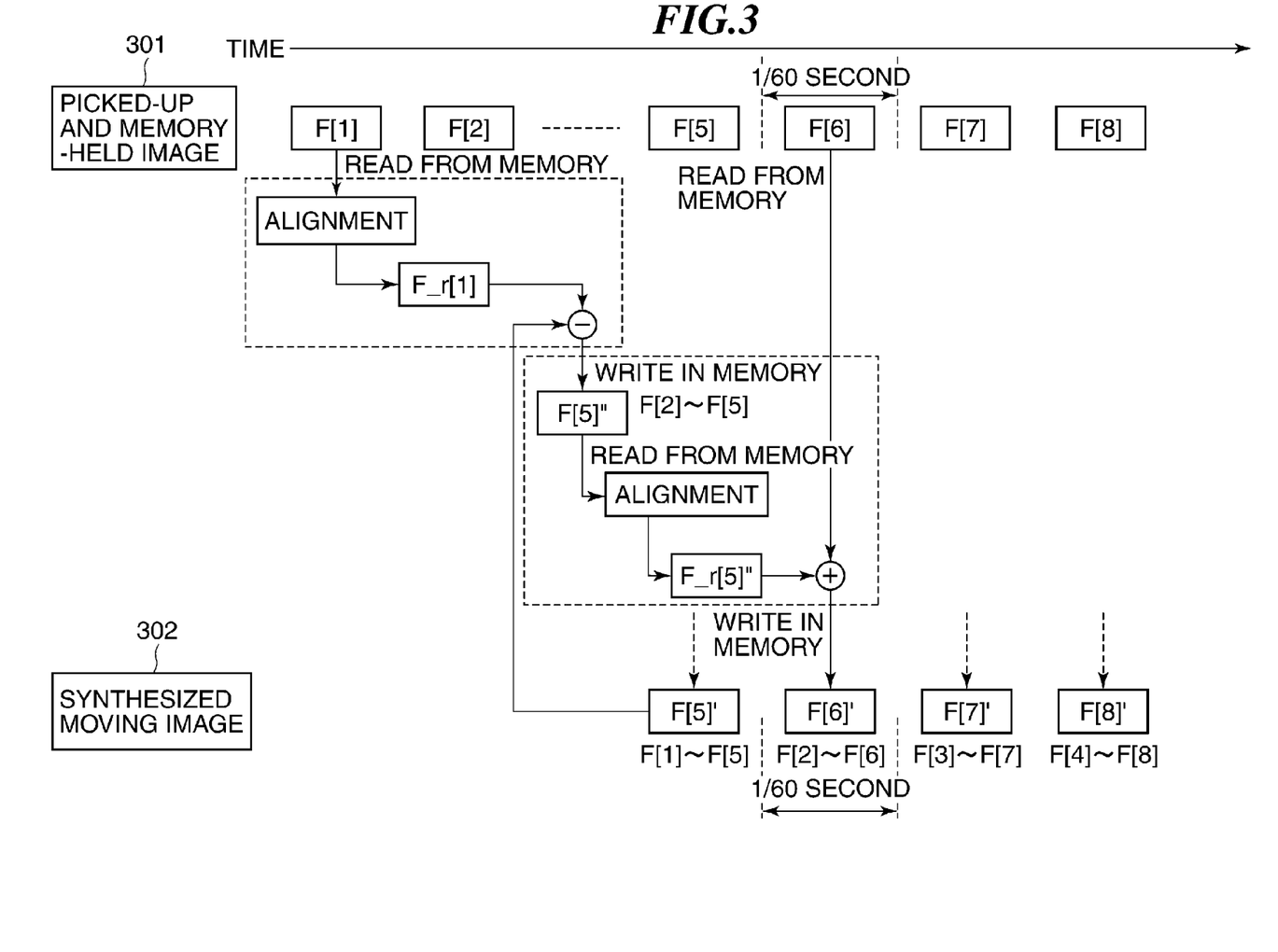
FIG. 3 is a timing chart useful in explaining the image synthesizing process in the digital video camera shown in FIG. 1.

FIGS. 2A and 2B are flowcharts of an image synthesizing process in the digital video camera shown in FIG. 1. FIG. 3 is a timing chart useful in explaining the image synthesizing process in the digital video camera shown in FIG. 1.

Referring to FIG. 3, image data written in the memory 105 is designated by reference numeral 301, and image data obtained as a result of synthesis is designated by reference numeral 302. n represents a frame number beginning with 1, F[n] represents image data of the nth frame written in the memory 105. F_r[n] represents image data obtained after image data of the nth frame is subjected to alignment. Each of F[n]' and F[n]" represents synthesized image data obtained by synthesizing image data up to the nth frame. Here, image data F[n] is input at intervals of 1/60 second, and synthesized image data F[n]' as well is generated at intervals of 1/60 second. Thus, an image synthesizing process, to be described later, is completed within a time period of 1/60 second.

Referring to FIGS. 1 to 3, when an image synthesizing process is started, first, the CPU sets the frame number n to 1 and sets the number of images to be synthesized N to 5 (step S201). Then, the CPU makes shutter speed equal to a set shutter speed. Thus, at the set shutter speed, an optical image input via the lens 100 and the shutter 101 forms an image on the CMOS sensor 102. Then, as described earlier, an analog signal which is an output from the CMOS sensor 102 is converted into a digital signal by the A/D converting section 103. The digital signal is subjected to image processing and rendered as image data F[n] by the camera signal processing section 104 (step S202). After that, the image data F[n] is written into the memory 105 (step S203). It should be noted that in the following description, image data will be referred to merely as an image.

Then, the CPU determines whether or not the present frame number n is greater than the number of images to be synthesized N (step S204). When n≤N (NO in the step S204), that is, when the present frame number n is not greater than 5, the CPU determines whether or not n=1 (step S205). When n=1 (YES in the step S204), that is, when the input image is an image of the first frame, the CPU controls the second and third switch sections 108 and 111 to supply the image F[1] stored in the memory 105 to the recording section 112 and the display section 113 via the image adding section 109. As a result, the image F[1] is recorded by the recording section 112 and displayed on the display section 113 (step S223). The image F[1] is also written as a synthesized image F[1]' into the memory 105. It should be noted that F[1]=F[1]' because in the first frame, there is no image to be synthesized.

Then, the CPU determines whether or not there is the next frame (step S224). When there is not the next frame (YES in the step S224), the CPU terminates the image synthesizing process. On the other hand, when there is the next frame (NO in the step S224), the CPU increments the frame number n (step S225). Here, because n=1, the frame number n is incremented to 2. The CPU then proceeds to the step S202.

When n is not equal to 1 in the step S205 (NO in the step S205), the CPU proceeds to step S207. For example, when the input image is an image of the second frame, the image aligning section 106 reads the synthesized image F[1]' of the first frame from the memory 105 under the control of the CPU (step S207). It should be noted that when the input image is an image of the nth frame, the image aligning section 106 reads a synthesized image F[n−1]' of images F[1] to F[n−1] from the memory 105. The image aligning section 106 then aligns the synthesized image F[n−1]' with reference to an image F[2] of the second frame to generate an aligned image F_r[1]' (step S208).

The CPU controls the first and second switch sections 107 and 108 to connect the image aligning section 106 and the memory 105 to the image adding section 109. The image adding section 109 reads the image F[2] from the memory 105 (step S209), and adds the image F[2] and the aligned image F_r[1]' together to generate a synthesized image F[2]' (step S210).

On this occasion, the CPU controls the third switch section 111 to select the image adding unit 109. As a result, the synthesized image F[2]' is written into the memory 105 (step S211). The process then proceeds to the step S223, in which the synthesized image F[2]' is recorded by the recording section 112 and displayed on the display section 113.

In the above described way, in the steps S208 to S211, the synthesized image F[n−1]' is aligned with the image F[n], and the aligned image F_r[n−1]' and the image F[n] are added together. Then, the synthesized image F[n]' (first synthesized image) obtained as a result of the addition is written into the memory 105.

When n>N in the step S204 (YES in the step S204), that is, when the input image is an image of the sixth frame, the CPU proceeds to step S213. At this stage, a synthesized image F[5]' of images in the first to fifth frames is stored in the memory 105. The image aligning section 106 reads the image F[1] of the first frame, which is the oldest image in terms of time among images constituting the synthesized image F[5]', from the memory 105. Namely, the image aligning section 106 reads an image F[n−N] (step S213). The image aligning section 106 aligns the image F[1] with an image F[5] to generate an aligned image F_r[1] (step S214).

The CPU controls the first and second switch sections 107 and 108 to connect the image aligning section 106 and the memory 105 to the image subtracting section 110. The image subtracting section 110 reads the synthesized image F[5]' from the memory 105 (step S215). The image subtracting section 110 then subtracts the aligned image F_r[1] from the synthesized image F[5]' to generate a synthesized image F[5]" (step S216).

On this occasion, the CPU controls the third switch section 111 to select the image subtracting section 110. As a result, the synthesized image F[5]" is written into the memory 105 (step S217). The synthesized image F[5]" is a synthesized image of the second to fifth frames because the image F[1] is subtracted from the synthesized image F[5]' of the first to fifth frames. The synthesized image F[5]" is an image that is temporarily generated, and the CPU does not record the synthesized image F[5]" by the recording section 112, and also, does not display the synthesized image F[5]" on the display section 113.

Then, the image aligning section 106 reads the synthesized image F[5]" from the memory 105 (step S218), and generates an aligned image F_r[5]" by aligning the synthesized image F[5]" with an image F[6] to be newly synthesized, which is newer in terms of time than images used for the synthesized image F[5]" (step S219).

The CPU controls the first and second switch sections 107 and 108 to connect the image aligning section 106 and the memory 105 to the image adding section 109. The image adding section 109 reads the image F[6] from the memory 105 (step S220). The image adding section 109 then adds the image F[6] and the aligned image F_r[5]" together (step S221) to generate a synthesized image F[6]' and store the same in the memory 105 (step S222).

The process then proceeds to the step S223, in which the CPU controls the third switch section 111 to record the synthesized image F[6]' by the recording section 112 and display the synthesized image F[6]' on the display section 113. The process then proceeds to the step S224.

It should be noted that for the seventh and subsequent frames, the processes in the steps S213 to S225 are carried out.

In the above describe way, in the processes in the steps S214 to S222, an image F[n−N] is aligned with an image F[n−1] to generate an aligned image F_r[n−N] (first aligned image). Next, the aligned image F_r[n−N] is subtracted from a synthesized image F[n−1]' (subtracting process) to obtain a synthesized image F[n−1]" (second synthesized image). Then, the synthesized image F[n−1]" is aligned with an image F[n] to generate an aligned image F_r[n−1]" (second aligned image). Thereafter, the aligned image F_r[n−1]" and the image F[n] are added together (adding process) to obtain a synthesized image F[n]' (third synthesized image).

Thus, in the first embodiment described above, because a synthesized image can be generated by one image addition and one image subtraction, synthesis can be performed without bringing about increases in processing time and the amount of data transferred to memory even when the number of images to be synthesized increases.

Figure 4:
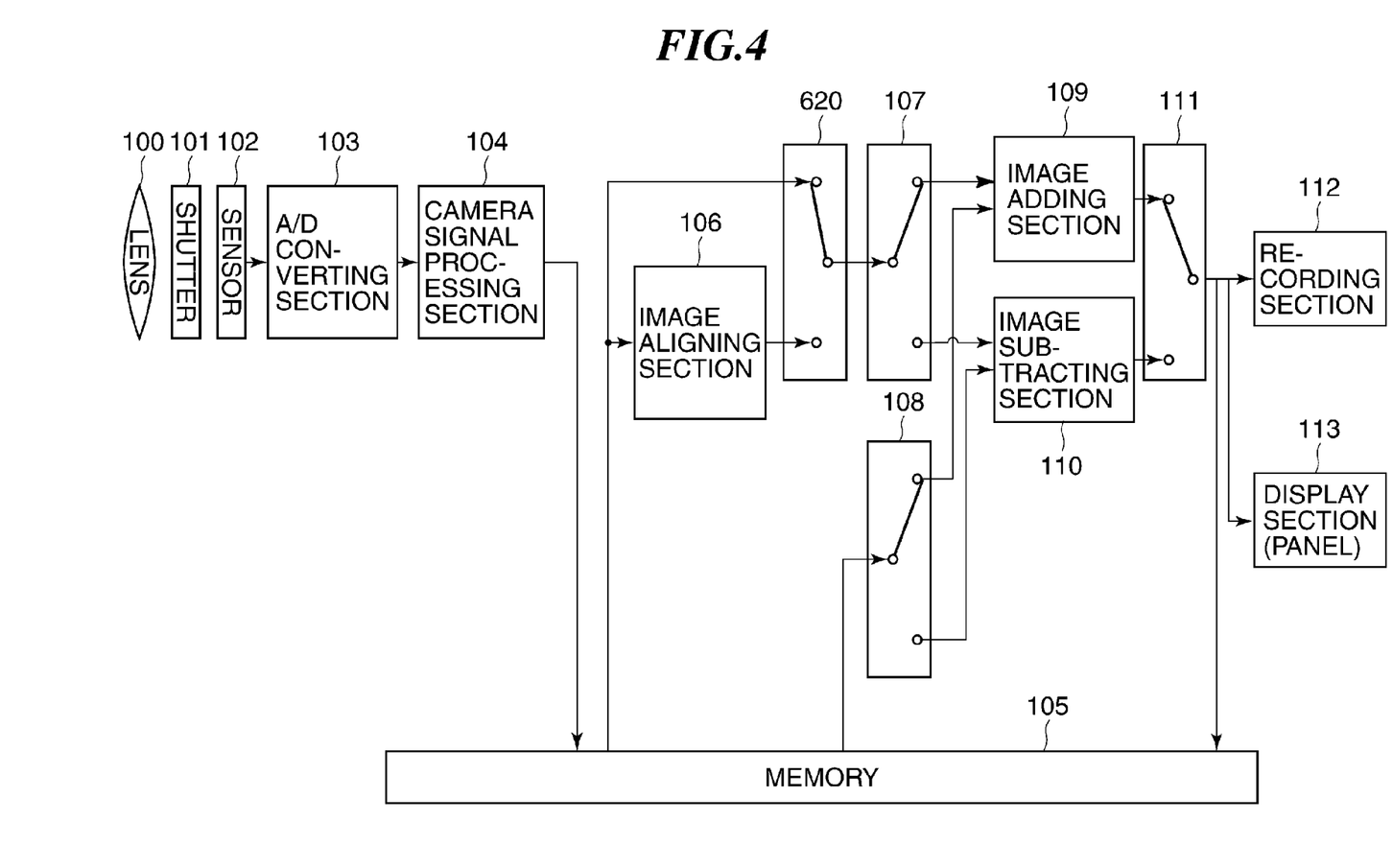
FIG. 4 is a block diagram showing an image pickup apparatus for which another exemplary image synthesizing apparatus according to the first embodiment of the present invention is used.

FIG. 4 is a block diagram showing an image pickup apparatus for which another exemplary image synthesizing apparatus according to the first embodiment of the present invention is used. It should be noted that in FIG. 4, the same component elements as those of the digital video camera shown in FIG. 1 are designated by the same reference numerals, and description thereof is omitted.

When pictures are taken using a video camera mounted on a tripod or the like, image blurring caused by camera shake is not likely to occur. On this occasion, in particular, it is unnecessary to perform alignment. Accordingly, the digital video camera shown in FIG. 4 is equipped with a fourth switch section 620. The fourth switch section 620 has an input side thereof connected to the memory 105 and the image aligning section 106 and has an output side thereof connected to the first switch section 107. The fourth switch section 620 is controlled by the CPU to select one of the memory 105 and the image aligning section 106.

In the digital video camera shown in FIG. 4, the processes in the steps S205 to S211 in FIG. 2A are carried out for the first to fifth frames of moving images. In the sixth frame, a synthesized image F[5]' of the first to fifth frames is held in the memory 105.

First, the image subtracting section 110 reads an image F[1] of the first frame, which is the oldest image in terms of time, from the memory 105, and subtracts the image F[1] from the synthesized image F[5]'. As a result, the image subtracting section 110 generates a synthesized image F[5]" and stores the synthesized image F[5]" in the memory 105.

Then, the image adding section 109 reads an image F[6] of the sixth frame and the synthesized image F[5]" from the memory 105, and adds the image F[6] and the synthesized image F[5]" together. As a result, the image adding section 109 generates a synthesized image F[6]' and stores the synthesized image F[6]' in the memory 105.

Next, a description will be given of an exemplary image synthesizing apparatus according to a second embodiment of the present invention.

Figure 5A:
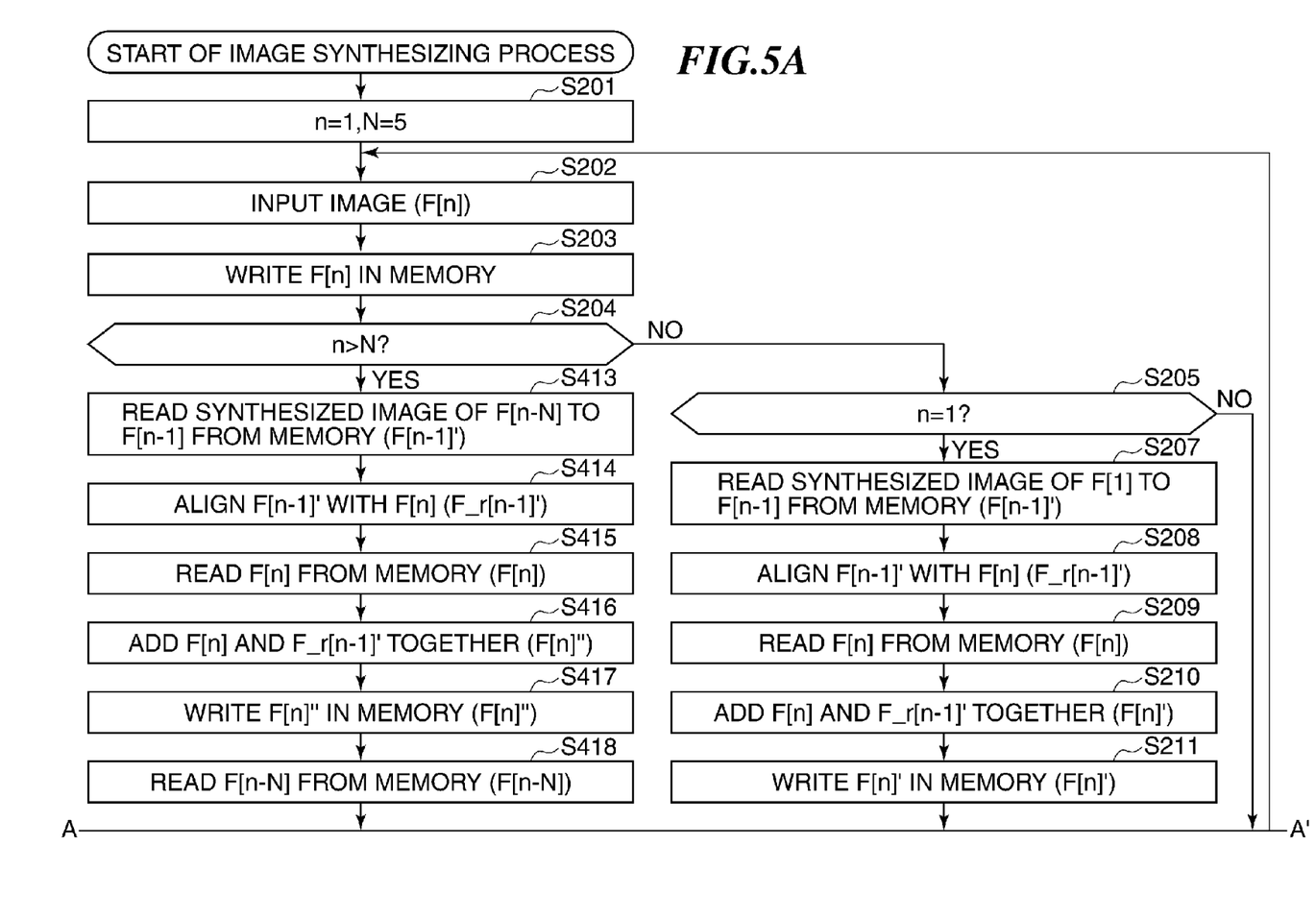
FIGS. 5A and 5B are flowcharts of an image synthesizing process in the digital video camera for which an image synthesizing apparatus according to a second embodiment of the present invention is used.
Figure 5B:
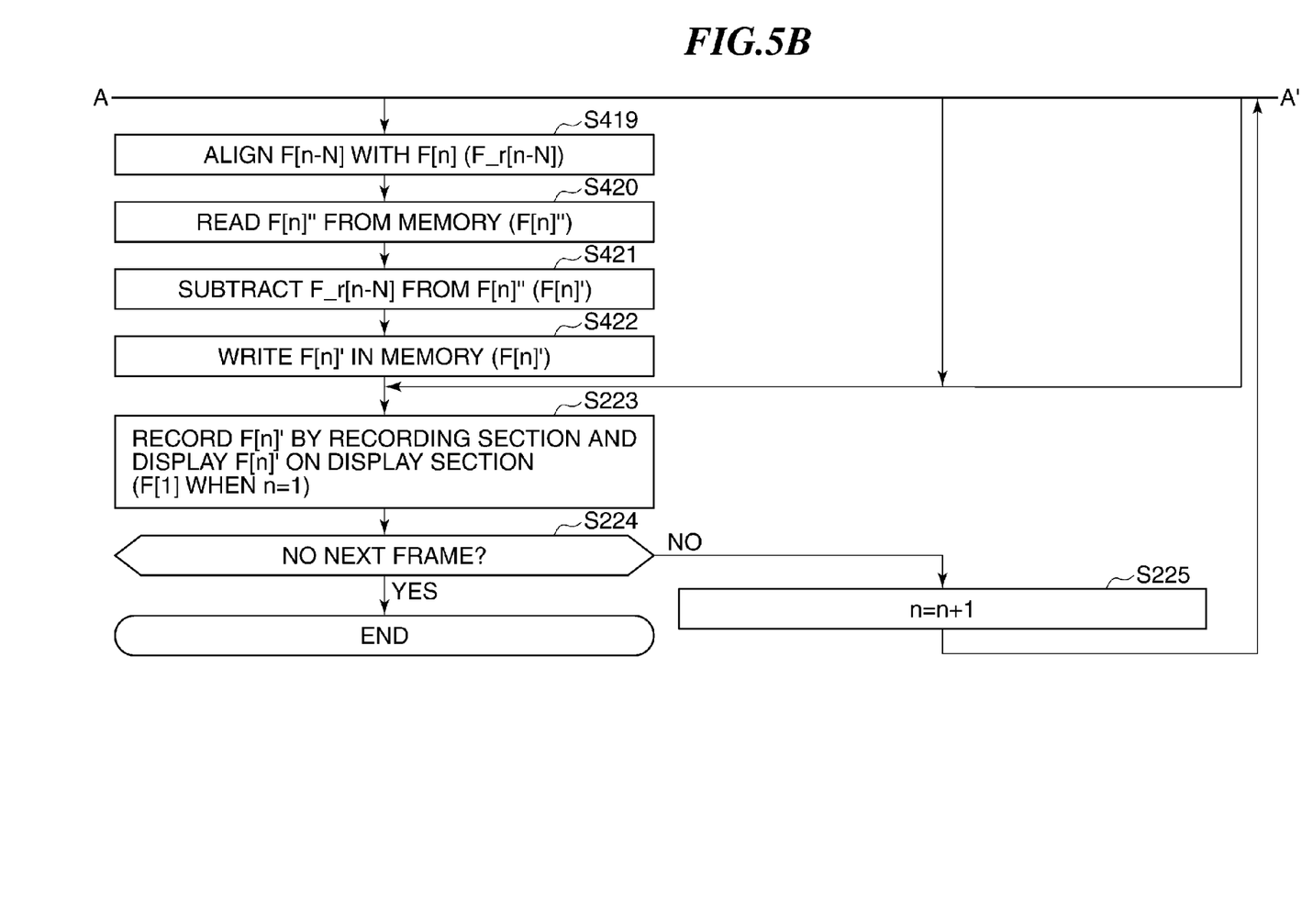
Figure 6:
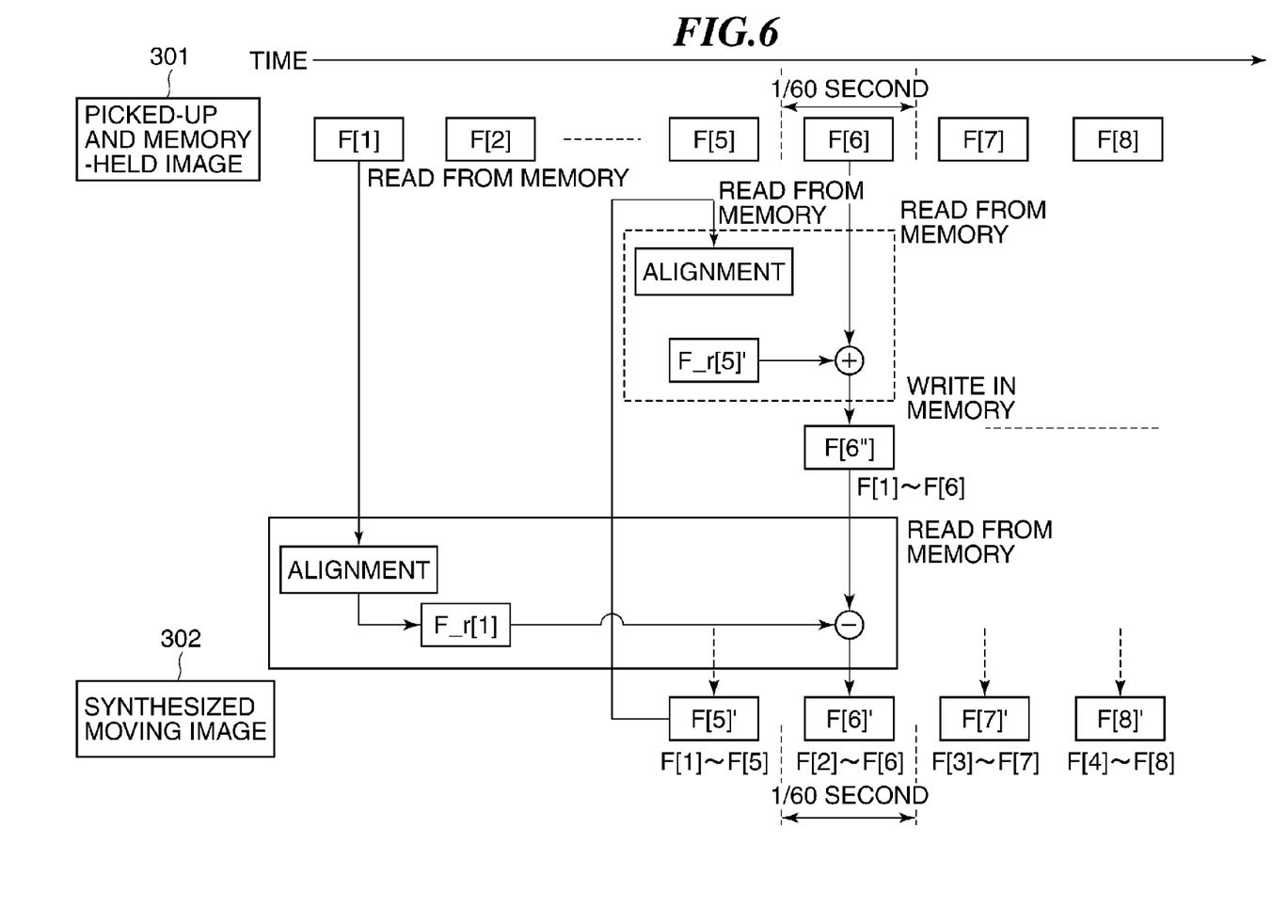
FIG. 6 is a timing chart useful in explaining the image synthesizing process in the digital video camera for which the image synthesizing apparatus according to the second embodiment of the present invention is used.

FIGS. 5A and 5B are flowcharts of an image synthesizing process in the digital video camera for which the image synthesizing apparatus according to the second embodiment of the present invention is used. FIG. 6 is a timing chart useful in explaining the image synthesizing process in the digital video camera for which the image synthesizing apparatus according to the second embodiment of the present invention is used.

It should be noted that the digital video camera according to the second embodiment has the same arrangement as the arrangement shown in FIG. 1. Moreover, in FIGS. 5A, 5B, and 6, the same processes as those in FIGS. 2A, 2B, and 3 are designated by the same reference numerals. In the following description, description of switching control over the first, second, and third switch sections 107, 108, and 110 by the CPU will be omitted.

Referring now to FIGS. 1, 5A, 5B, and 6, a description will be given of a case where a moving image is generated by synthesizing five images in the digital video camera. In the way described above with reference to FIGS. 2A and 2B, the processes in the steps S201 to S211 are carried out. Assuming now that n>N in the step S204, that is, when an input image is an image of the sixth or later frame, the process proceeds to step S413. Assuming that an input image is an image of the sixth frame, a synthesized image F[5]' of the first to fifth frames is stored in the memory 105.

In the step S413, the image aligning section 106 reads the synthesized image F[5]' from the memory 105. Then, the image aligning section 106 aligns the synthesized image F[5]' with an image F[6], which is to be newly synthesized, to generate an aligned image F_r[5]' (step S414).

The image adding section 109 reads the image F[6] from the memory 105 (step S415). Then, the image adding section 109 adds the image F[6] and the aligned image F_r[5]' together (step S416) to generate a new synthesized image F[6]". The image adding section 109 stores the synthesized image F[6]" in the memory 105 (step S417).

The synthesized image F[6]", which is a synthesized image of the first to sixth frames, is an image obtained by adding an image of the sixth frame to the synthesized image of the first to sixth frames. The synthesized image F[6]" is an image that is temporarily generated, and is not recorded by the recording section 112 and not displayed by the display section 113.

Then, the image aligning section 106 reads an image F[1], which is the oldest image in terms of time among images constituting the synthesized image F[6]", from the memory 105 (step S418). Then, the image aligning section 106 aligns the image F[1] with the synthesized image F[6]" to generate an aligned image F_r[1] (step S419).

Next, the image subtracting section 110 reads the synthesized image F[6]" from the memory 105 (step S420). Then, the image subtracting section 110 subtracts the aligned image F_r[1] from the synthesized image F[6]" (step S421) to generate a synthesized image F[6]'. The image subtracting section 110 stores the synthesized image F[6]' in the memory 105 (step S422). Thereafter, the process proceeds to the step S223 described above with reference to FIG. 2B.

It should be noted that for the seventh and subsequent frames as well, the processes in the steps S413 and S422 are carried out.

Thus, in the second embodiment described above as well, because a synthesized image can be generated by one image addition and one image subtraction, synthesis can be performed without bringing about increases in processing time and the amount of data transferred to memory even when the number of images to be synthesized increases.

Figure 7:
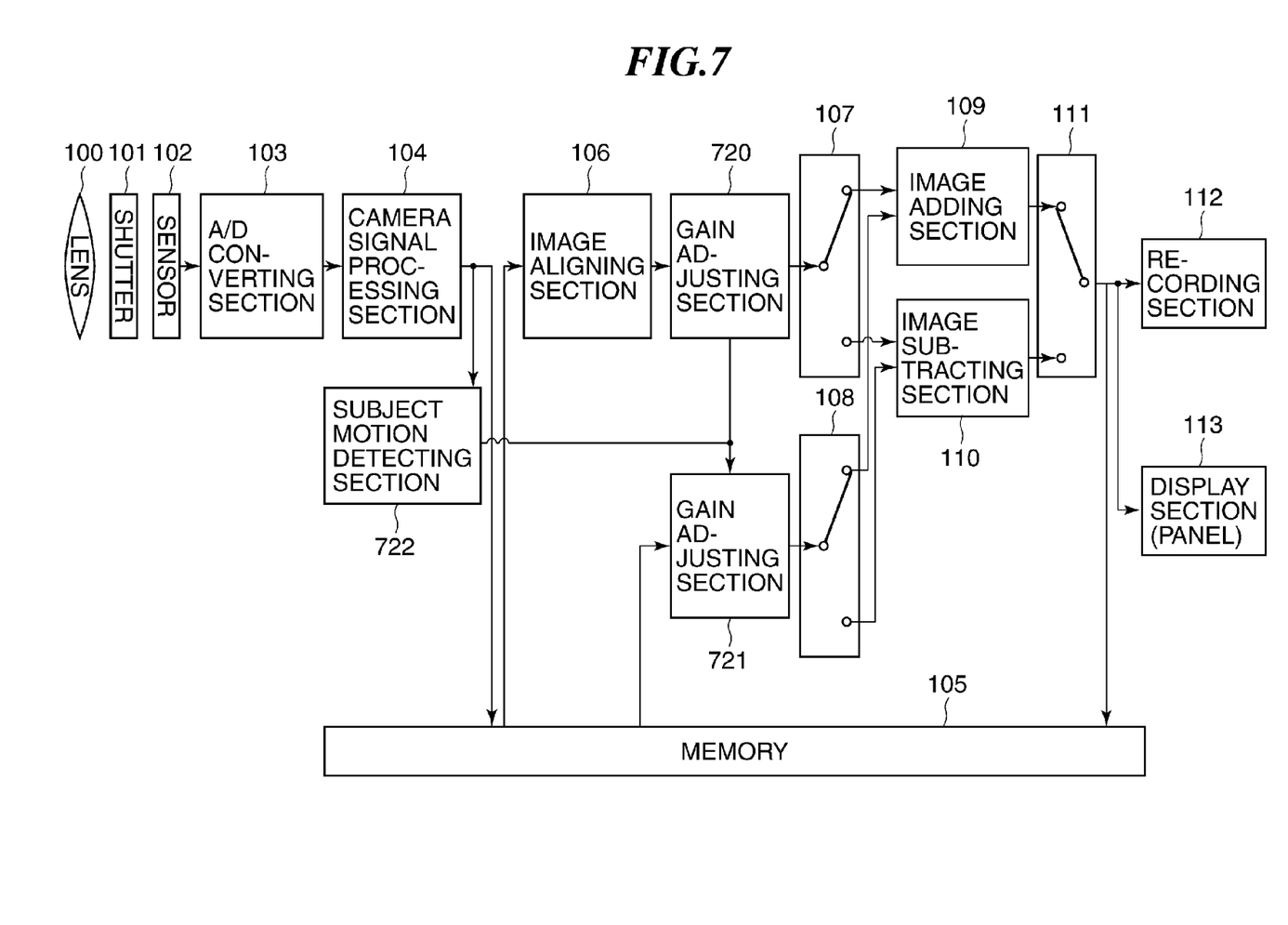
FIG. 7 is a block diagram showing an image pickup apparatus for which an exemplary image synthesizing apparatus according to a third embodiment of the present invention is used.

FIG. 7 is a block diagram showing an image pickup apparatus for which an exemplary image synthesizing apparatus according to a third embodiment of the present invention is used. It should be noted that in FIG. 7, the same component elements as those of the digital video camera shown in FIG. 1 are designated by the same reference numerals, and description thereof is omitted.

The digital video camera shown in the figure has a subject motion detecting section 722 (motion detecting unit) and first and second gain adjusting sections 720 and 721 (gain adjusting units). The subject motion detecting section 722 is supplied with image data which is an output from the camera signal processing section 104. The subject motion detecting section 722 detects a motion of a subject such as a person in an image according to image data and outputs a motion detecting signal.

As shown in the figure, the first gain adjusting section 720 is connected to an output of the image aligning section 106, and the second gain adjusting section 721 is connected to the memory 105. The first gain adjusting section 720 adjusts the gain of an aligned image which is an output from the image aligning section 106 according to a motion detecting signal. Likewise, the second gain adjusting section 721 adjusts the gain of an image read from the memory 105 according to a motion detecting signal.

Figure 8:
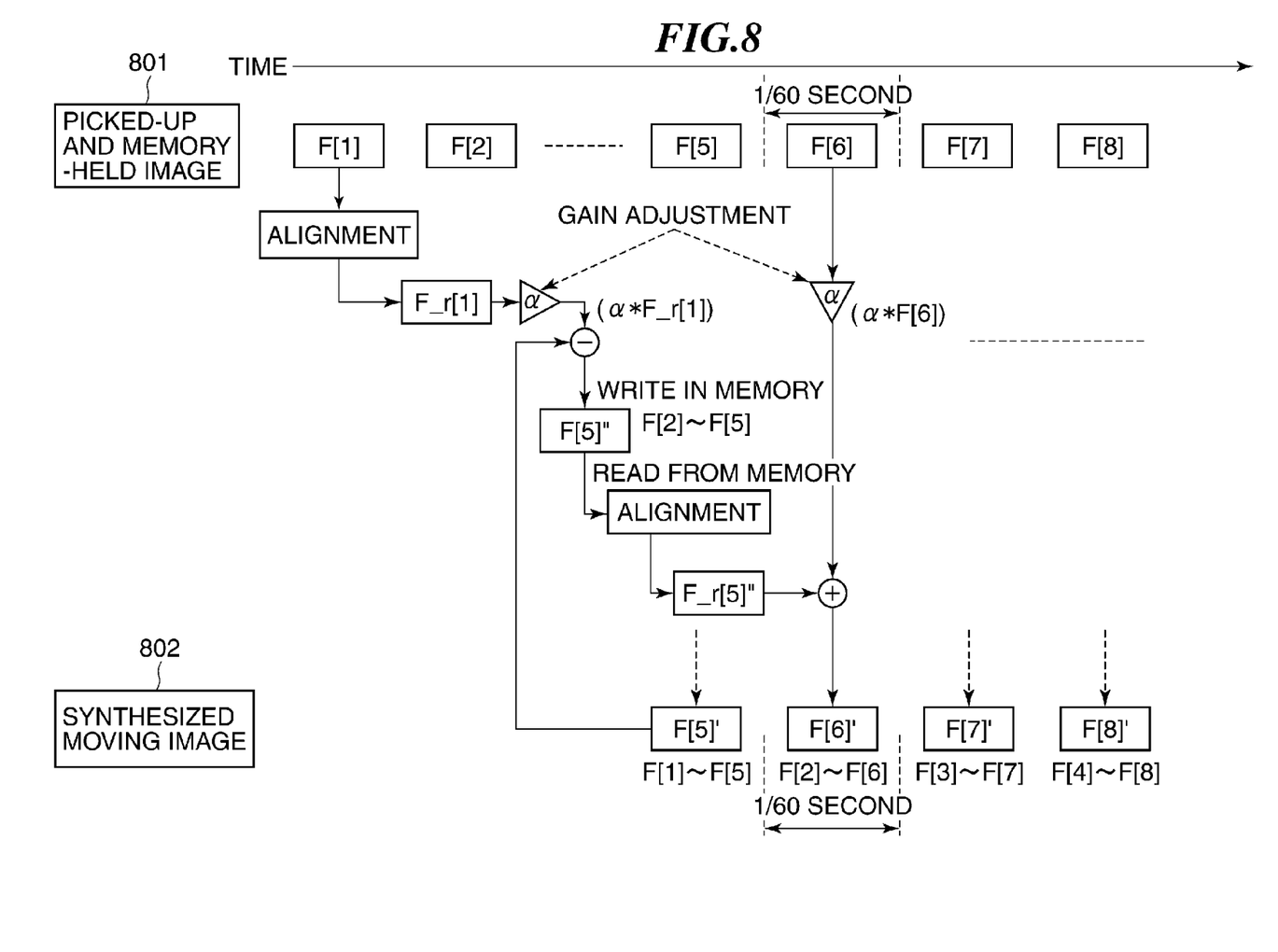
FIG. 8 is a timing chart useful in explaining an image synthesizing process in the digital video camera shown in FIG. 7.

FIG. 8 is a timing chart useful in explaining an image synthesizing process in the digital video camera shown in FIG. 7.

Referring to FIGS. 7 and 8, assume now that the frame of a moving image is the sixth frame, and the subject motion detecting section 722 detects a motion of a subject in this frame. In this case, gain adjustment is carried out so as to reduce the effect of an image in the sixth frame while leaving the effect of an image of the first frame as it is as will be described later. It should be noted that in the following description, description of switching control over the first, second, and third switch sections 107, 108, and 111 by the CPU will be omitted.

First, the image aligning section 106 reads an image F[1], which is the oldest image in terms of time among images constituting a synthesized image F[5]', from the memory 105. Then, the image aligning section 106 aligns the image F[1] with an image F[5] to generate an aligned image F_r[1]. The first gain adjusting section 720 multiplies the aligned image F_r[1] by a predetermined gain ($\alpha$) to generate a gain-adjusted image ($\alpha$*F_r[1]). As described earlier, subtraction is performed for the first frame, and here, $\alpha$ is set to be smaller than 1 so as to leave the effect of the first frame as it is.

The image subtracting section 110 subtracts the gain-adjusted image ($\alpha$*F_r[1]) from the synthesized image F[5]' read from the memory 105 to generate a synthesized image F[5]". Then, the image subtracting section 110 stores the synthesized image F[5]" in the memory 105. The synthesized image F[5]" is an image obtained by subtracting an image of the first frame, whose gain has been adjusted, from a synthesized image of the first to fifth frames.

Next, the image aligning section 106 reads the synthesized image F[5]" from the memory 105. The image aligning section 106 aligns the synthesized image F[5]" with an image F[6], which is to be newly synthesized, to generate an aligned image F_r[5]". The second gain adjusting section 721 multiplies the image F[6] by a predetermined gain ($\alpha$) to generate a gain-adjusted image ($\alpha$*F[6]). For an image of the sixth frame, addition is performed as described above, and the same gain ($\alpha$) as the gain for the first frame is used here.

The image adding section 109 adds the aligned image F_r[5]" read from the memory 105 and the gain-adjusted image ($\alpha$*F[6]) together to generate a new synthesized image F[6]'. The image adding section 109 then stores the synthesized image F[6]' in the memory 105.

Thus, in the third embodiment, because an image to be added and an image to be subtracted are subjected to gain adjustment when a subject moves during a synthesizing process, the effect of the subject's motion can be reduced.

According to the present embodiment, as described above, when moving images are to be synthesized, an image synthesizing process can be carried out without bringing about increases in processing time and the amount of data transferred to memory irrespective of the number of images to be synthesized.

As is clear from the above description, in FIG. 1 and other figures, the image adding section 109 acts as a first synthesizing unit, and the image adding section 109 and the image subtracting section 110 acts as a second synthesizing unit. The memory 105, the image aligning section 106, the first switch section 107, the second switch section 108, the image adding section 109, the image subtracting section 110, and the third switch section 111 constitute the image synthesizing apparatus.

Other Embodiments

Aspects of the present invention can also be realized by a computer of a system or apparatus (or devices such as a CPU or MPU) that reads and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-145591 filed Jun. 30, 2011, which is hereby incorporated by reference herein in its entirety.

What is claimed is:

1. An image synthesizing apparatus that synthesizes a plurality of frames to obtain a synthesized image, comprising:
   a first synthesizing unit configured to synthesize a preset number of frames to obtain a first synthesized image, wherein the first synthesized image is stored in a memory; and
   a second synthesizing unit configured to, when an image of an alternative frame is to be synthesized with the first synthesized image, read out the first synthesized image from the memory, subtract an image of a predetermined frame used for the synthesis obtaining the first synthesized image from the first synthesized image, and add the image of the alternative frame to the subtracting result to generate a third synthesized image.

2. An image synthesizing apparatus according to claim 1, wherein said second synthesizing unit comprises:
   a subtracting unit that subtracts the image of the predetermined frame from the first synthesized image to obtain a second synthesized image; and
   an adding unit that adds the image of the alternative frame to the second synthesized image to obtain the third synthesized image.

3. An image synthesizing apparatus according to claim 2, further comprising:
   an image aligning unit configured to, when the image of the alternative frame is to be synthesized with the first synthesized image, align the image of the predetermined frame with the first synthesized image to generate a first aligned image,
   wherein the subtracting unit performs subtraction using the first aligned image as the image of the predetermined frame,
   said image aligning unit aligns the second synthesized image with the image of the alternative frame to generate a second aligned image, and
   the adding unit performs addition using the second aligned image as the second synthesized image to obtain the third synthesized image.

4. An image synthesizing apparatus according to claim 1, wherein the image of the predetermined frame is the oldest image among images constituting the first synthesized image.

5. An image synthesizing apparatus according to claim 1, wherein the image of the alternative frame is an image of a newer frame than images of frames used for the first synthesized image.

6. An image synthesizing apparatus according to claim 1, further comprising:
   a motion detecting unit configured to detect a motion of a subject between the image of the alternative frame and an image of a frame before the alternative frame; and
   a gain adjusting unit configured to, when a motion of the subject is detected by said motion detecting unit, adjust a gain of an image before addition and subtraction processing.

7. An image synthesizing apparatus according to claim 6, wherein the gain adjusting unit multiplies the alternative frame by a predetermined gain to generate a gain-adjusted image and the second synthesizing unit subtracts the gain-adjusted image from the synthesized image to generate a gain-adjusted synthesized image.

8. A control method for an image synthesizing apparatus that synthesizes a plurality of frames to obtain a synthesized image, comprising:
   a first synthesizing step of synthesizing a preset number of frames to obtain a first synthesized image;
   a storing step of storing the first synthesized image, in a memory; and
   a second synthesizing step of, when an image of an alternative frame is to be synthesized with the first synthesized image, reading out the first synthesized image from the memory, subtracting an image of a predetermined frame used for the synthesis obtaining the first synthesized image from the first synthesized image, and adding the image of the alternative frame to the subtracting result to generate a synthesized image.

9. A non-transitory computer-readable storage medium storing a control program for causing an image synthesizing apparatus to implement a control method used by the image synthesizing apparatus that synthesizes a plurality of frames to obtain a synthesized image, the control method comprising:
   a first synthesizing step of synthesizing a preset number of frames to obtain a first synthesized image;
   a storing step of storing the first synthesized image in a memory; and
   a second synthesizing step of, when an image of an alternative frame is to be synthesized with the first synthesized image, reading out the first synthesized image from the memory, subtracting an image of a predetermined frame used for the synthesis obtaining the first synthesized image from the first synthesized image, and adding the image of the alternative frame to the subtracting result to generate a synthesized image.

10. An image synthesizing apparatus that synthesizes a plurality of frames to obtain a synthesized image, comprising:
    a first synthesizing unit configured to synthesize a preset number of frames to obtain a first synthesized image, wherein the first synthesized image is stored in a memory; and
    a second synthesizing unit configured to, when an image of an alternative frame is to be synthesized with the first synthesized image, read out the first synthesized image from the memory, add the image of the alternative frame to the first synthesized image, and subtract an image of a predetermined frame used for the synthesis obtaining the first synthesized image from the adding result to generate a third synthesized image.

11. An image synthesizing apparatus according to claim 10, wherein said second synthesizing unit comprises:
    an adding unit that adds the image of the alternative frame to the first synthesized image to obtain a second synthesized image; and
    a subtracting unit that subtracts the image of the predetermined frame from the second synthesized image to obtain a third synthesized image, and uses the third synthesized image as the synthesized image.

12. An image synthesizing apparatus according to claim 11, further comprising an image aligning unit configured to, when the image of the alternative frame is to be synthesized, align the first synthesized image with the image of the alternative frame to obtain a first aligned image,
    wherein the adding unit performs addition using the first aligned image as the first synthesized image to obtain the second synthesized image,
    said image aligning unit aligns the image of the predetermined frame with the second synthesized image to obtain a second aligned image, and
    the subtracting unit performs subtraction using the second aligned image as the image of the predetermined frame to obtain the third synthesized image.

13. An image synthesizing apparatus according to claim 10, wherein the image of the predetermined frame is the oldest image among images constituting the first synthesized image.

14. An image synthesizing apparatus according to claim 10, wherein the image of the alternative frame is an image of a newer frame than images of frames used for the first synthesized image.

15. A control method for an image synthesizing apparatus that synthesizes a plurality of frames to obtain a synthesized image, comprising:
    a first synthesizing step of synthesizing a preset number of frames to obtain a first synthesized image;
    a storing step of storing the first synthesized image, in a memory; and
    a second synthesizing step of, when an image of an alternative frame is to be synthesized with the first synthesized image, reading out the first synthesized image from the memory, adding the image of the alternative frame to the first synthesized image, and subtracting an image of a predetermined frame used for the synthesis obtaining the first synthesized image from the adding result to generate a synthesized image.

16. A non-transitory computer-readable storage medium storing a control program for causing an image synthesizing apparatus to implement a control method used by the image synthesizing apparatus that synthesizes a plurality of frames to obtain a synthesized image, the control method comprising:
    a first synthesizing step of synthesizing a preset number of frames to obtain a first synthesized image;
    a storing step of storing the first synthesized image in a memory; and
    a second synthesizing step of, when an image of an alternative frame is to be synthesized with the first synthesized image, reading out the first synthesized image from the memory, adding the image of the alternative frame to the first synthesized image, and subtracting an image of a predetermined frame used for the synthesis obtaining the first synthesized image from the adding result to generate a synthesized image.

* * * * *